US009707602B2

(12) United States Patent
Herrera-Astorga et al.

(10) Patent No.: US 9,707,602 B2
(45) Date of Patent: Jul. 18, 2017

(54) SYSTEM AND METHOD FOR WASHING MECHANICAL PARTS

(71) Applicant: DECISIONES AMBIENTALES, S.A. DE C.V., Zapopan, Jalisco (MX)

(72) Inventors: David Herrera-Astorga, Jalisco (MX); Gerardo Gonzalez-Sanchez, Jalisco (MX)

(73) Assignee: DECISIONES AMBIENTALES, S.A. DE C.V., Zapopan, Jalisco (MX)

(*) Notice: Subject to any disclaimer, the term of this patent is extended or adjusted under 35 U.S.C. 154(b) by 0 days.

(21) Appl. No.: 14/779,057

(22) PCT Filed: Mar. 20, 2014

(86) PCT No.: PCT/IB2014/000398
§ 371 (c)(1),
(2) Date: Sep. 22, 2015

(87) PCT Pub. No.: WO2014/147469
PCT Pub. Date: Sep. 25, 2014

(65) Prior Publication Data

US 2016/0052023 A1 Feb. 25, 2016

(30) Foreign Application Priority Data

Mar. 22, 2013 (MX) .................... MX/a/2013/003275

(51) Int. Cl.
*C03C 23/00* (2006.01)
*B08B 3/08* (2006.01)
(Continued)

(52) U.S. Cl.
CPC ................ *B08B 3/08* (2013.01); *B08B 3/006* (2013.01); *C11D 3/38654* (2013.01); *C11D 11/0023* (2013.01)

(58) Field of Classification Search
CPC ....... B08B 3/08; B08B 3/006; C11D 3/38654; C11D 3/0023
(Continued)

(56) References Cited

U.S. PATENT DOCUMENTS 4,066,398 A * 1/1978 Hwa ....................... C23F 11/08 106/14.12
5,107,876 A 4/1992 Ozyjiwsky
(Continued)

FOREIGN PATENT DOCUMENTS

CN 102242022 A 11/2011
WO 9611072 A2 4/1996
WO 2008121078 A1 10/2008

*Primary Examiner* — Duy Deo
*Assistant Examiner* — Maki Angadi
(74) *Attorney, Agent, or Firm* — Browdy and Neimark, PLLC

(57) ABSTRACT

A system for washing mechanical parts polluted with hydrocarbons is described, which includes a) a cleaning fluid; b) an enzymatic complex that catalyzes the oxidative degradation of hydrocarbons coating the mechanical parts, wherein said enzymatic complex is located within a filter cartridge; and, c) a washing sink. By using the described system, daily degradation efficiency from 250 to 500 g of transformed hydrocarbons in $CO_2$ and $H_2O$ is achieved. Moreover, a method to perform washing of mechanical parts is described.

28 Claims, 4 Drawing Sheets

(51) Int. Cl.
*C11D 3/386* (2006.01)
*C11D 11/00* (2006.01)
*B08B 3/00* (2006.01)

(58) Field of Classification Search
USPC ........... 134/2, 4, 17, 22.1, 22.19, 44, 57, 88; 252/79.1–79.4
See application file for complete search history.

(56) References Cited

U.S. PATENT DOCUMENTS

| | | | | |
|---|---|---|---|---|
| 6,057,147 | A * | 5/2000 | Overland | B08B 3/006 210/600 |
| 2003/0235904 | A1 | 12/2003 | Vandenbergh | |
| 2006/0042210 | A1 * | 3/2006 | Dallas | B01D 39/083 55/524 |
| 2006/0105937 | A1 * | 5/2006 | Duran | C11D 1/835 510/504 |
| 2015/0014254 | A1 * | 1/2015 | Jensen | B01D 35/18 210/709 |

* cited by examiner

SYSTEM AND METHOD FOR WASHING MECHANICAL PARTS

TECHNICAL FIELD

The present invention is related to the cleaning of mechanical parts and engines in the Metal-Mechanical Industry, and more particularly, it is related to a system and method for washing mechanical parts, free of petroleum-derived solvents, which allows indefinite use of the cleaning agent and an efficient degradation of hydrocarbons polluting the mechanical parts.

BACKGROUND OF THE INVENTION

Even though the industrial machines or sinks for the cleaning of mechanical parts have been used since the beginning of the industrial revolution, when the petroleum-based lubricants were invented, these are currently still in use, despite the environmental pollution problem they generate.

Typical industrial sinks for the cleaning of mechanical parts consist essentially of a bottom reservoir (usually a single 120 L metallic drum) from which a cleaning fluid is recycled to a washing sink using a submersible pump. In the washing sink, the user washes the part with the fluid, returning said already used cleaning fluid to the bottom reservoir through gravity.

The cleaning fluid is a hydrocarbon degreaser or naphtha, which, although initially is very effective in the waste removal due to its solvent capability, it is of little use regarding durability, since with only just 2% grease content it starts leaving greasy residues on the "washed parts". Likewise, said cleaning fluid is made 100% by volatile organic compounds (VOCS), so it is highly air-polluting; in addition, it is flammable, and it is cataloged by the National Fire Protection Association (NFPA) within the risk 3 category in flammability and 2 in health. The above makes it necessary for this type of cleaners to be renewed frequently, and that the waste materials are disposed of according to the regulations for hazardous waste.

Similarly, these industrial sinks have other drawbacks such as the lack of instrumentation allowing the control or monitoring of the physicochemical variables such as temperature, pH, fluid level or aeration.

Based on the above, various systems and apparatus have been developed for the washing of mechanical or industrial parts, which include the use of microorganisms to achieve the cleaning of said pieces without having the above-mentioned drawbacks.

For example, the U.S. Pat. No. 6,057,147 describes a device consisting of a reservoir to clean hydrocarbon-polluted objects, which has means to enter a recyclable cleaning solution, which is recycled to wash the objects; means to drain the solution from the reservoir to a biochamber; and means to monitor said solution when it enters the biochamber. In turn, the biochamber contains means to aerate and stir the solution, as well as outlet means to a plurality of filters to filter the cleaning solution and remove sediments. The cleaning solution disclosed herein comprises aerobic microorganisms which degrade hydrocarbons, such as *Achromobacter, Bacillus, Flavobacterium* and *Pseudomonas* spp, among others.

Further, in U.S. Pat. No. 6,762,047 an aqueous composition is disclosed, which may be used in various apparatus or industrial sinks to remove oils, grease, etc., from mechanical objects, said composition comprises at least one species of

*Pseudomonas*, as well as water, a non-ionic ethoxylated surfactant, an alkaline metal nitrate, and optionally, mono ammonia phosphate as buffer.

Similarly, U.S. Pat. No. 6,571,810 describes an apparatus for the washing of mechanical parts, which comprises a sink wherein the parts are contacted with a fluid; the sink is in communication with a tank having live microorganisms which degrade organic matter, such that the fluid is recycled in a closed environment. The apparatus also has a filter containing microorganisms fixed thereto, which is positioned in the tank. The microorganisms used can biodegrade organic compounds such as hydrocarbons, oils, grease, etc., and may be selected from those of the genera *Bacillus, Micrococcus, Flavobacterium*, among others. The filter works as a vehicle to contact microorganisms with the cleaning fluid, and it has microorganisms bonded together by a water-soluble encapsulating agent, which releases the microorganisms when the cleaning fluid is introduced into the filter. Referring to the cleaning fluid, it is compatible with the microorganisms such that they are able to live in the fluid (for example, a mixture of surfactants and emulsifiers having non-volatile organic compounds, phosphates, formaldehyde, biocides, etc.). Further, the apparatus comprises a submersible pump to recycle the cleaning fluid, a level signaling, a heater, a control panel, etc. The apparatus works as follows: the pump pumps the cleaner fluid from the tank to the sink, where the cleaning of the parts is carried out.

While the systems for the washing of parts described above (including the use of biodegradable cleaners having various microorganisms) allow to reduce the environmental issues associated with the use of solvents and waste-disposal, they continue having certain disadvantages.

These disadvantages include the need to replace the degreaser or cleaner frequently (every three to four days), since this becomes saturated with pollutants and starts an anaerobic decomposition process, releasing bad odors. In addition, the cleaning fluid used must be disposed of as hazardous waste, since despite of being biodegradable, being saturated with used lubricant, the whole liquid is considered as hazardous waste.

In addition, the industrial apparatus or sinks for the cleaning of mechanical parts working under the same liquid recycling principle, and which use the bioremediation process for grease and oils, are usually manufactured from high density polyethylene plastic (HDPE), thus being more prone to suffer damages while in use, since the metallic nature of the mechanical parts in the end causes the breaking of the sink surface.

Another disadvantage is that the existing industrial sinks operate under physicochemical conditions focused on trying to optimize bioremediation with microorganisms, thereby generating a higher energy consumption (as the working temperature commonly used is about 41° C.) resulting uncomfortable to the operators; in addition, this also causes the short-term evaporation of the perfume used to make the use of the cleaning fluid more pleasant (less than a week), generating bad odors within a month, or even earlier.

OBJECTS OF THE INVENTION

Taking the shortcomings of the prior art into account, it is an object of the present invention to provide a system and a method of washing mechanical parts, which include an apparatus for the washing of the mechanical parts, which is durable and resistant to wear, and which does not use petroleum-derived solvents.

It is another object of the present invention to provide a system and method of washing mechanical parts which achieve maximum oxidative degradation of the lubricant hydrocarbons, and which allow reuse of the cleaning fluid for an indefinite period of time.

A further object of the present invention is to provide an environmentally friendly system and method of washing mechanical parts.

BRIEF DESCRIPTION OF THE INVENTION

To this end, a system for washing mechanical parts has been developed comprising: (a) a cleaning fluid; (b) an enzymatic complex which catalyzes the oxidative degradation of hydrocarbons coating the mechanical parts, wherein said enzymatic complex is located within a filtering cartridge; and, (c) an apparatus or sink comprising: i) a container or sink wherein the dirty mechanical parts are received to be washed, which includes a drain defined therein; (ii) a reservoir tank where the cleaning fluid is set, which is located at the bottom side of said container and in communication therewith through the drain; (iii) a bulkhead located between the container and the reservoir tank, where the instrumentation is mounted, and a submerged pump which recycles the cleaning fluid from the reservoir tank to the container or sink, first passing through the filtering cartridge; and, (iv) a frame to support the container and the reservoir tank.

Other aspects of the invention consider the apparatus and the method for washing mechanical parts.

BRIEF DESCRIPTION OF THE FIGURES

The novel aspects considered characteristic of the present invention will be particularly established in the appended claims. However, some embodiments, features and some other objects and advantages thereof will be better understood by the following detailed description, when read related to the appended drawings, wherein:

DETAILED DESCRIPTION OF THE INVENTION

It has been found that the system and method for washing mechanical parts of the present invention allows maximum oxidative degradation of hydrocarbons present in said mechanical parts, and allows the reuse of the cleaning fluid for an indefinite period of time, resulting friendly to the environment and also to the personnel operating this apparatus.

For the purpose of the present invention, mechanical parts are defined as machinery, equipment or automotive parts, either of metal or plastic, which have been polluted with hydrocarbons, such as grease and oils.

The system for washing mechanical parts comprises: (a) a cleaning fluid; (b) an enzymatic complex which catalyzes the oxidative degradation of the hydrocarbons coating the mechanical parts, wherein said enzymatic complex is located within a filtering cartridge; and, (c) a washing apparatus or sink comprising: i) a container or sink where the dirty mechanical parts are received to be washed, which includes a drain defined therein; (ii) a reservoir tank where the cleaning fluid is set, which is located at the bottom side of said container and in communication therewith through the drain; (iii) a bulkhead located between the container and the reservoir tank, where the instrumentation is mounted, and a submerged pump which recycles the cleaning fluid from the reservoir tank to the container or sink, first passing through the filtering cartridge; and, (iv) a frame to support the container and the reservoir tank.

Figure 1:
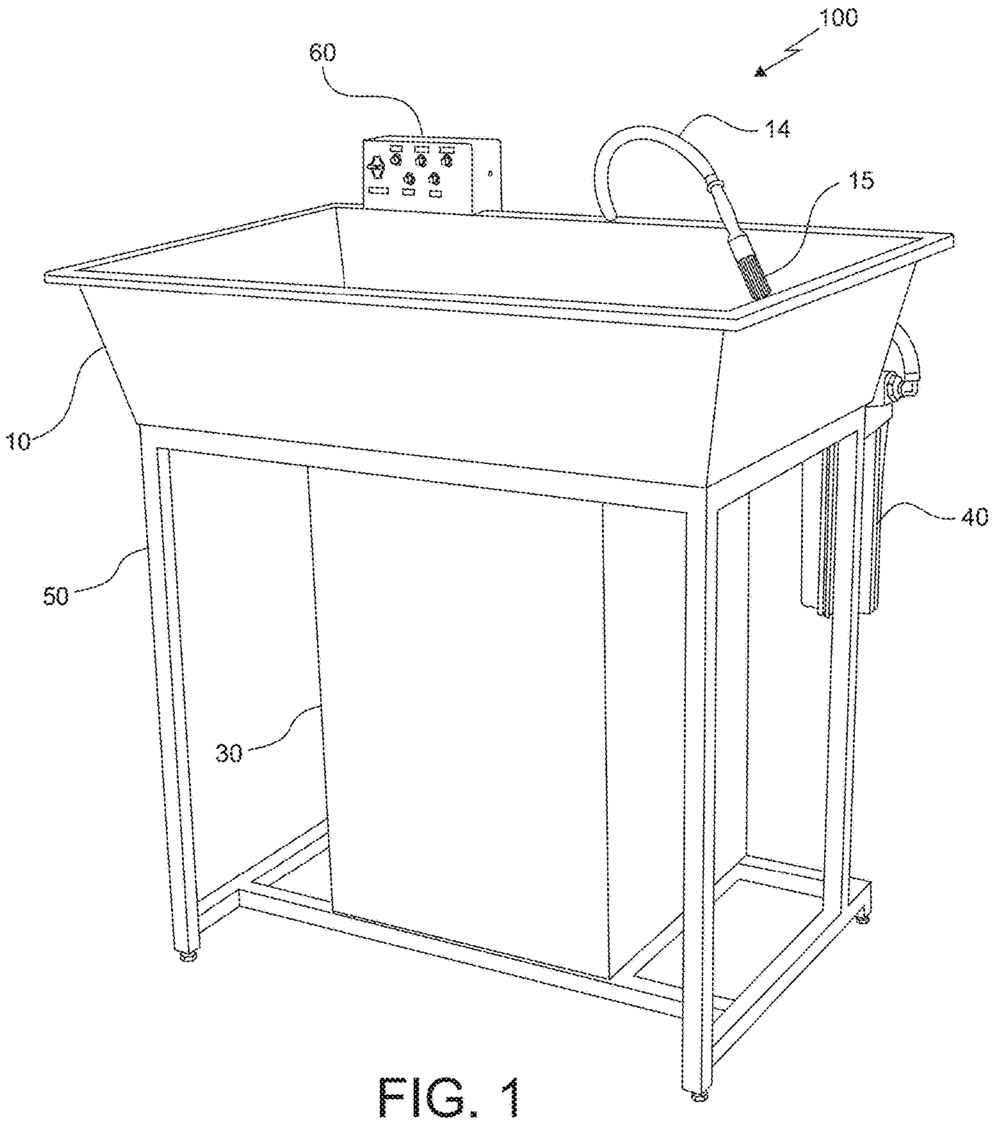
FIG. 1 is a perspective view of an apparatus for the washing of mechanical parts, built according to the principles of a particularly preferred embodiment of the present invention.
Figure 2:
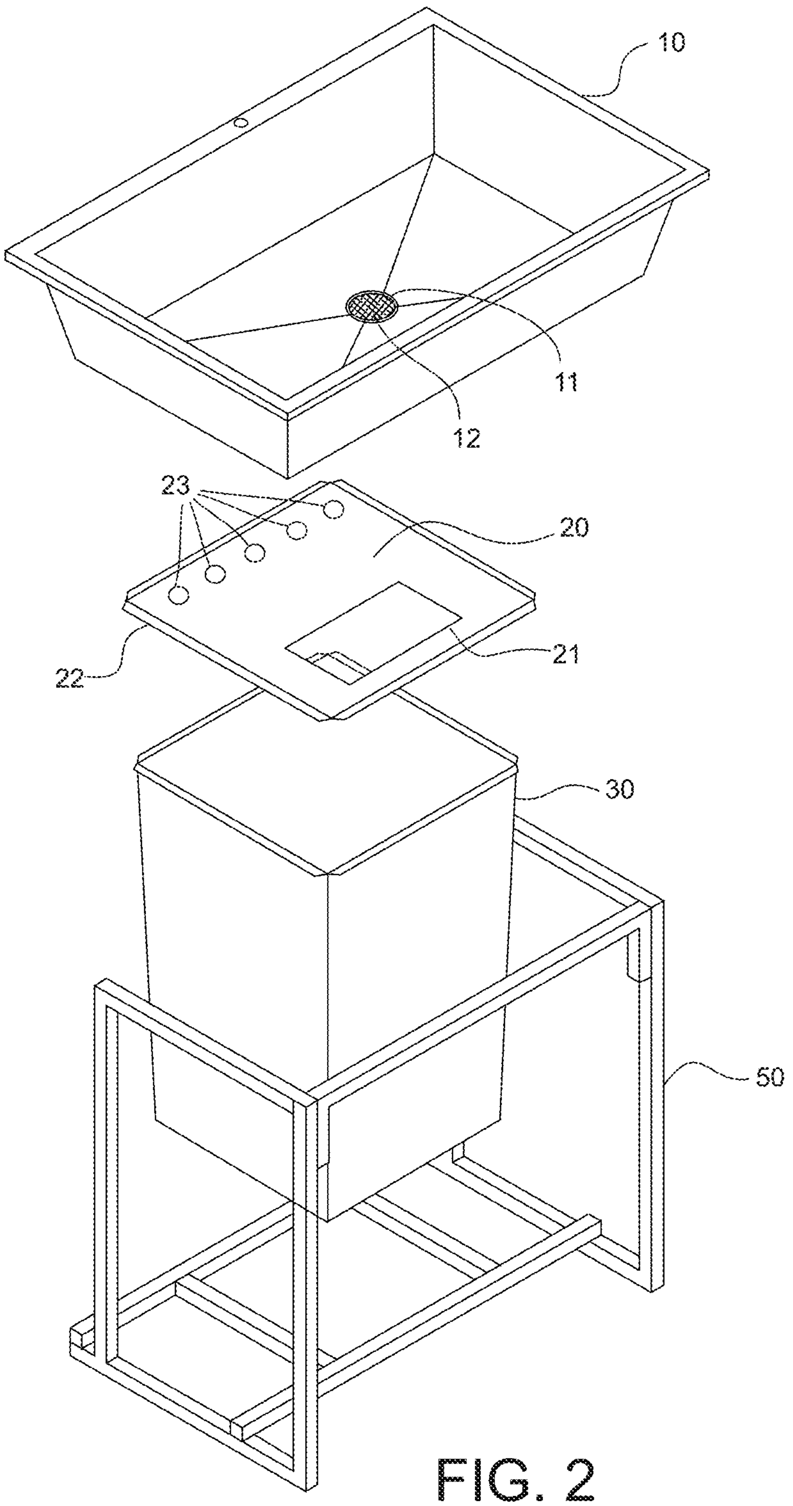
FIG. 2 is an exploded perspective view of the apparatus for the washing of mechanical parts of FIG. 1.
Figure 3:
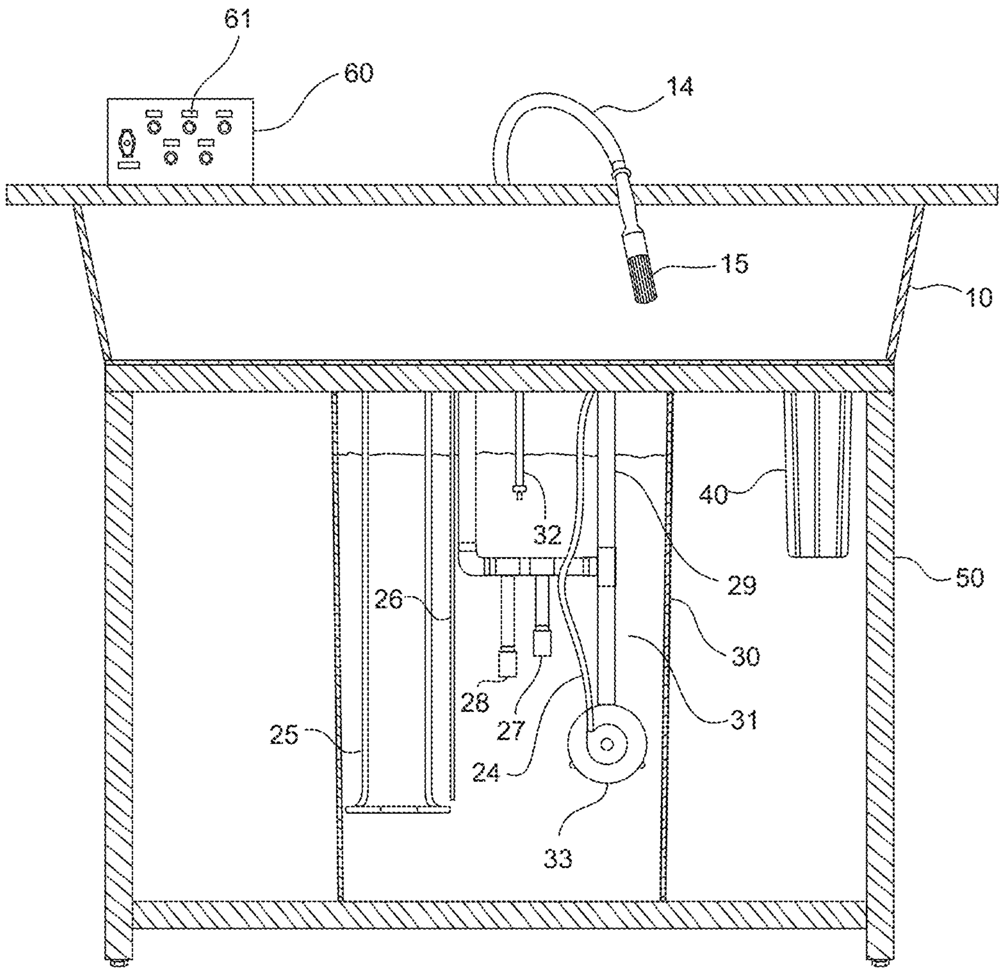
FIG. 3 is a longitudinal-section front view of the apparatus for the washing of mechanical parts of FIG. 1, which shows all the elements thereof.

Referring now to the appended drawings, and more specifically to FIGS. 1 to 3, the system for the washing of mechanical parts of the present invention is shown, including a sink 100 for the washing of mechanical parts built according to a preferred embodiment of the present invention, which, in general includes: a washing container or sink 10 including a drain nozzle 11 located at the bottom side thereof, and in its central portion; and, a reservoir tank 30 to collect the washing fluid through the drain nozzle 11, which communicates the container 10 and the reservoir tank 30.

Importantly, the elements conforming the sink 100 may adopt any geometric shape, with the single condition of being easily assembled to each other. In the preferred embodiment being described, both the sink 10 and the reservoir tank 30 are square-shaped.

On the other hand, still referring to the particularly preferred embodiment of the invention, in the drain nozzle 11 a basket-shape stainless mesh sieve 12 is placed, where a flexible sponge is installed to retain solids so they do not fall into the reservoir tank 30.

The container 10 further includes a flexible hose 14 supplying a cleaner fluid to wash the parts and to remove the hydrocarbons present therein; optionally, the hose end has a cleaning fixture, such as an inner flow brush 15, which facilitates the circulation of the cleaning fluid to the container 10 to carry out the washing of the mechanical parts.

Moreover, the container 10 includes at its lower outer face an assembling element (not shown in the drawings), preferably squared, press-fitted on a detachable bulkhead 20, located between the container 10, and the reservoir tank 30, the press-fit of the assembly element is made in an opening 21 located at the lower medium portion of the bulkhead 20, which has the suitable dimensions to receive said squared-assembly element.

The detachable bulkhead 20 also includes a side tab 22 all around its perimeter, which allows its attachment to the reservoir tank 30; and a plurality of holes 23 located at the end opposite to the opening 21, in order to mount heating and instrumentation means required for the system operation and to measure the process physicochemical conditions to carry out a proper washing of the mechanical parts.

Inside the reservoir tank 30 and below the bulkhead 20 covering said reservoir tank 30, a submersible pump 33 is installed, preferably a centrifugal pump, with the necessary interconnections to pump out the cleaning fluid 31 contained in the reservoir tank 30 and to discharge it through a conduit or hose 24 in order to recycle it first through a filtering device 40, which preferably includes a filtering cartridge, externally located at one side of the reservoir tank 30, such that once the cleaning fluid has passed through the filtering device 40, is sent to the container 10 through the flexible hose 14, which is interconnected at the filtering device outlet 40.

The heating means, the instrumentation and the submersible pump 33 are supported on the bulkhead 20 through the plurality of holes 23, such that they remain immersed in the cleaning fluid 31 at the time of positioning the bulkhead 20. The reservoir tank 30 may be, optionally, slightly tapered to allow the above to be stacked.

On the other hand, under the container or sink 10 and under the reservoir tank 30, a frame 50 is located, which supports both the container 10 and the reservoir tank 30. The reservoir tank 30 base is fixed to the frame 50 by fastening means, preferably screws and nuts, which allow to easily remove both the container or sink 10 and the reservoir tank 30; such that the frame 50 can be disassembled easily, in order to facilitate both shipment and storage of the industrial sink 100 when not in use.

Figure 4:
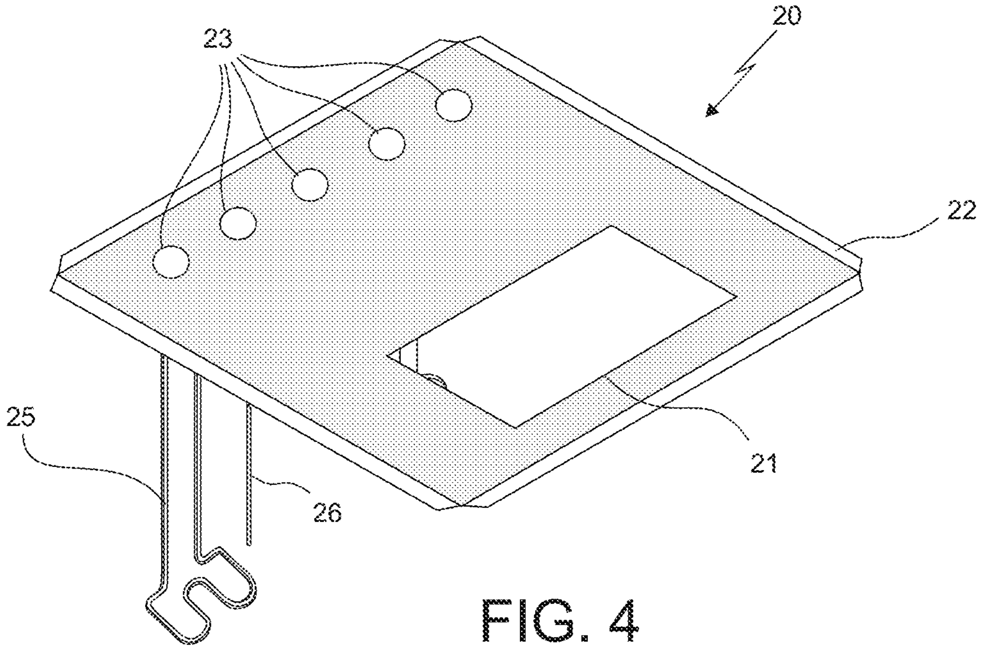
FIG. 4 is an upper front perspective view of the bulkhead included in the apparatus for the washing of mechanical parts of FIG. 1.

In FIG. 4 of the appended drawings, a detail of bulkhead 20 can be seen, wherein the heating and instrumentation means which are supported therein, comprise: a heating device 25, preferably an electrical resistance, providing the required heating to maintain the required temperature on the cleaning fluid 31 contained in the reservoir tank 30; a temperature sensor 26 immersed in the cleaning fluid 31 and adjacent to the heating device 25; a first and a second level sensors 27 and 28, respectively, located at different heights inside the reservoir tank 30; and, an air diffuser 32 to diffuse the air supplied to the cleaning fluid 31 contained in the reservoir tank for oxygenation purposes.

The mounting of the heating source 25 on the bulkhead 20 may be done through fixing nuts mounted in the upper ends and holding with lock nuts in drilled holes in said bulkhead 20.

The temperature sensor 26 may preferably be a thermocouple or a resistive temperature detector (RTD), which is immersed in the cleaning fluid 31 and located between 15 and 25 cm away from the heating source 25. The temperature sensor 26 sends this parameter information to a temperature controller device interconnected therewith. This temperature controller device analyzes the temperature increases/decreases with time and calculates the energy flows so the temperature control "peaks" are not exceeded and an optimal performance temperature range of between 30 and 39° C. is maintained. Preferably, the temperature controller has a programming and operation indication monitor or display, wherein the temperature of the cleaning fluid can be read, and also the indication of whether the power supply is on or in standby. In addition, a solid state relay is installed connected in line to the temperature controller, which operates to optimize and to protect the system from electrical surges.

The first and second level detectors 27 and 28, respectively, are preferably of the floating-type with magnetic switch and are located at different heights within the reservoir tank 30, and they send an electrical signal to a control panel electronic board 60, which is detailed below.

The first level sensor 27 is located at a higher height with respect to the second level sensor 28, so when the first level sensor 27 is actuated, it means that the cleaning fluid level 31 has decreased to that level, thus requiring the addition of cleaning fluid 31 to reach the appropriate level again. When this situation occurs, the sink 100 continues operating normally with respect to the heating, aeration and liquid pumping.

On the other hand, when the second level sensor 28 is actuated, which is located such that it is closer to the reservoir tank 30 bottom and below the location of the first level sensor 27, the sink 100 stops working, except for the aeration subsystem, with the purpose of continuing supplying oxygen to the system, but at the same time protect it from overheating. When this occurs, even a higher amount of cleaning fluid 31 should be added to the sink 100 so the optimal level is reached again, as well as the optimal operation state.

Optionally, when each of the first and/or second level detectors 27 and 28, respectively, is actuated, a signaling light is turned on in the control panel, corresponding to each level sensor.

With respect to the submersible pump 23, this should always be located below the second level sensor 28, so it never works in vacuum nor pumps grease and oils which will be floating on the cleaning fluid surface 31.

In a particularly preferred embodiment of the invention, the mounting of the level detectors 27 and 28, and of the pump 23 on the bulkhead 20 is performed by means of a support structure 29, preferably made of stainless steel tubing, which in the embodiment shown in FIG. 3 shows a configuration in the form of the Arabian number four (4). This support structure 29 works as a support for both the detectors and the pump, as an isolated conduit for the electrical wires which energize the pump 23 and which transfer the signal from the first and second level detectors 27 and 28, respectively, to a control panel electric board 60.

However, with respect to the control panel 60, in the embodiment described, this is located at the left rear end of the washing container or sink perimeter 10. The control panel 60 consists of an electronic board having a controller logic circuit for the sink functions 100; optionally, it may include signaling lights 61 to have visual indication of the sink 100 operation. Also, within the control panel 60 an aeration pump is located, which supplies air into the cleaning fluid 31.

In a preferred embodiment, the supplied air is dispersed through a stiff-foam air diffuser 32, which is located between 15 and 35 cm below the cleaning fluid 31 surface above-mentioned, so the path of the generated micro-bubble has the ability to dissolve the oxygen in said environment. Optionally, an "optotriac" device may be installed in the electronic board, which detects the operation of the above-mentioned aeration pump and turns on an operation signaling light in the control panel 60. Also, the control panel 60 may have two fuses installed, one for the aeration system and another one for the remaining circuits, in case any overload or short circuit is generated in the electrical system.

With respect to the material used to manufacture the apparatus or sink 100 of the present invention, specifically the container 10, the bulkhead 20 and the reservoir tank 30, stainless steel is preferred.

With respect to the hydrocarbon-oxidase enzymatic complex used in the present invention and coating the filtering device cartridge 40, this is obtained from *Bacillus subtilis, Bacillus licheniformes* and *Pseudomonas* spp.

Figure 5:
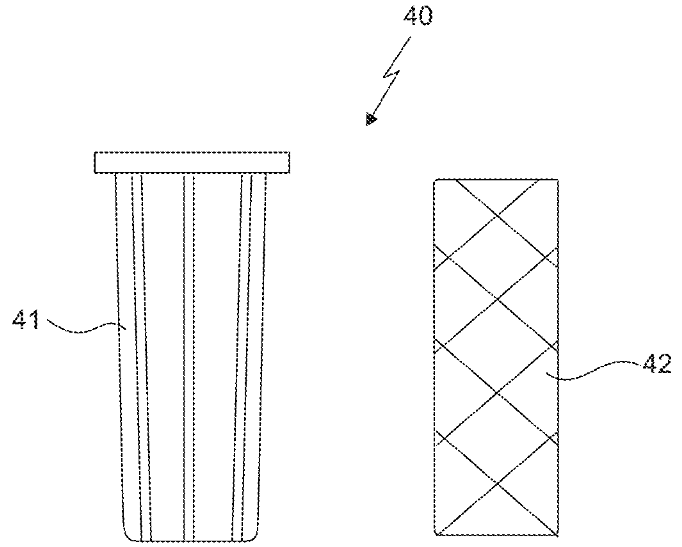
FIG. 5 is a front view showing the parts of the filtering cartridge which belongs to the apparatus for the washing of mechanical parts in FIG. 1.

In FIG. 5 of the appended drawings, the filtering device 40 configuration can be seen, consisting of a glass or container 41 having a filtering cartridge 42 inside, including a ball made from pleated paper or hemp, which is embedded in the above-mentioned enzymatic complex. Preferably, the filtering material is made from hemp and it has a permittivity flux from 100 to 200 μm, preferably 100 μm.

Optionally, the filtering material 42 may also be coated with an up to 1% methylparaben solution, which acts as a preservative to prevent the undesirable growth of fungi.

The coating of the filtering material 42 of the cartridge 40 is done such that the enzymatic complex is concentrated therein, i.e. it is coated and air-dried, then coated and air-dried again. The process is repeated until achieving saturation in each cartridge.

With respect to the cleaning fluid, this must be compatible with the hydrocarbon-oxidase enzymatic complex, such that the enzymes in said complex be capable of acting on the hydrocarbons of the washed mechanical parts. Said cleaning fluid comprises by weight: a) from 0.1 to 5.5% sodium xylenesulfonate; b) from 0.5 to 4.0% butyl carbitol or butyl cellosolve; c) from 0.01 to 3.5% of a low energy biodegradable surfactant; d) from 1.0 to 5.0% of a polar or anionic surfactant; e) from 0.3 to 1.7% of an antifoaming agent; f) from 0.005 to 0.45% sodium carbonate; g) from 0.05 to 1.0% sodium metasilicate, or sodium hydroxide combined with a 50 wt % corrosion inhibitor; h) from 0.05 to 0.25% freshener; and, i) from 78.6 to 97.5% demineralized water.

In a preferred embodiment of the present invention, the cleaning fluid comprises by weight: a) from 3.0 to 4.0% sodium xylenesulfonate; b) from 1.5 to 2.5% butyl carbitol or butyl cellosolve; c) from 0.01 to 0.5% of a low energy biodegradable surfactant; d) from 1.0 to 2.0% of a polar or anionic surfactant; e) from 0.5 to 1.5% of an antifoaming agent; f) from 0.20 to 0.40% sodium carbonate; g) from 0.3 to 0.8% sodium metasilicate, or sodium hydroxide combined with a 50 wt % corrosion inhibitor; h) from 0.10 to 0.20% freshener; and, i) from 88.1 to 93.35% demineralized water.

Preferably, the low energy biodegradable surfactant is caprylyl pyrrolidone.

With respect to the anionic or polar surfactant, this is selected from ethoxylated nonyl phenol at 10 mols (NF-10), alkoxylated alcohols and sodium benzen dodecyl sulfonate, preferably using nonyl phenol ethoxylated at 10 mols.

With respect to the antifoaming agent, this is selected from a methyloxirane polymer with oxirane, a depumarol silicone emulsion or a Dow Corning silicone emulsion, preferably using a methyloxirane polymer with oxirane.

As the corrosion inhibitor, triethanolamine phosphate (CAS #10017-56-8), the product referred to as "Becrosan 2125" from Lubrizol company or the product "Wedolit" from Wedolit company may be used, preferably using triethanolamine phosphate.

In a preferred embodiment of the invention, the cleaning fluid comprises in weight: (a) from 0.1 to 4.0% of sodium xylenesulfonate; (b) from 0.5 to 2.5% butyl carbitol; (c) from 0.01 to 0.5% caprylyl pyrrolidone; (d) from 1.0 to 2.0% of nonyl phenol ethoxylated at 10 mols; (e) from 0.5 to 1.5% methyloxirane polymer with oxirane; (f) from 0.005 to 0.40% sodium carbonate; (g) from 0.05 to 0.8% sodium metasilicate; h) from 0.10 to 0.20% freshener; e, i) from 88.1 to 97.5% demineralized water.

With respect to the functioning of the apparatus or sink 100 of the present invention, first, it must be assembled and connected to a power supply.

Once connected to the power supply, the sink 100 is turned on thus lighting a first signaling light corresponding to the second level sensor 28 (which indicates the critical lack of fluid), as well as a second signaling light corresponding to the aeration.

Subsequently, the cleaning fluid 31 is added to the reservoir tank 30, while it is added and the level is increased, the first signaling light is turned off, and a third signaling light is turned on, which would be turned off by reaching about half-level required of the cleaning fluid 31, even though not all of the required fluid 31 has been added. Finally, when adding the cleaning fluid 31 up to a predetermined level, the second signaling light corresponding to the aeration should remain turned on.

When the optimal operating temperature in the system is achieved, a fourth signaling light is turned on, then having the apparatus 100 ready-to-use for the washing of mechanical parts. To this end, the workpiece to be washed is placed in the container or sink 10, the submersible pump 23 is turned on and the cleaning fluid 31 is passed through the filtering device 40, whereby said cleaning fluid 31 drags the hydrocarbon-oxidase enzymatic complex by dissolution.

When the flow of the cleaning fluid 31 starts in combination with the enzymatic complex through the hose 14 and the inner flow brush 15, the part to be washed is soaked. The piece is rubbed with the brush 15 to remove the lubricant grease or oil and when the part is clean, the submersible pump 23 is turned off and the piece is drained.

As mentioned above, the cleaning fluid 31 flow in combination with the enzymatic complex passes through the hose 14 and the brush 15 and soaks the parts to be washed; it is at this moment that the catalysis starts, i.e. when the fluid contacts the hydrocarbons in the mechanical part. The cleaning fluid 31 in combination with the enzymatic complex and the hydrocarbons drains through the drain 13 toward the reservoir tank 30, where suitable conditions and oxygen are provided to continue with the degradation process.

When the enzymatic complex is depleted from the cartridge, this will be working as a filtering material only, and when saturated with solids it should be replaced with another cartridge.

On the other hand, the enzymes of the complex will be acting in the aqueous medium provided by the cleaning fluid 31, and although a depletion of the enzymatic complex will happen, it will be replenished periodically when the filtering device cartridge 40 is replaced, as mentioned above. Preferably, the filtering cartridge should be replaced approximately every 3 months.

On the other hand, the drag of cleaning fluid occurring in the mechanical parts, as well as the drag of water due to the air-flow, causes a decrease in the cleaning fluid 31 level in the reservoir tank 30.

When the fluid decreases to a certain level, the above-mentioned third signaling light will be turned on, thus indicating that a certain amount of cleaning fluid 31 should be added. In case this amount is not added and the fluid level continues decreasing, the first signaling light of a critical lack of fluid will be turned on. If this occurs, only the aeration subsystem will remain operating.

Also, since the removed hydrocarbons are usually accompanied by non-degradable materials, sediments accumulate at the bottom of tank 30, making the removal thereof necessary.

To this end, the container 10, the bulkhead 20 and the reservoir tank 30 are removed from the equipment 100, leaving only the reservoir tank 30 uncovered on the frame 50, and removing the cleaning fluid 31 from the reservoir tank 30 with a manual or electric pump, and at the end, removing the sediments with a spatula or plastic bucket. Subsequently, the cleaning fluid 31 is returned to the reservoir tank 30, replenishing the necessary cleaning fluid 31 to reach the suitable level, and the apparatus 100 is reassembled. The sediments removed from the bottom of the reservoir tank 30 will not have grease and oils, so they could be handled under legal criteria for non-hazardous waste.

Another aspect of the invention is a method for washing mechanical parts polluted with hydrocarbons, using the system described above, which comprises the following steps:

a) placing the mechanical parts to be washed in the container or sink;
b) circulating the cleaning fluid from the reservoir tank to the filtering device such that said cleaning fluid drags the enzymatic complex contained in said filtering cartridge;
c) circulating the cleaning fluid having the enzymatic complex to the container, and washing the mechanical parts with said cleaning fluid;
d) draining the cleaning fluid from the container to the reservoir tank, wherein the enzymatic complex acts to carry out a hydrocarbon oxidative degradation; and,
e) recycling the cleaning fluid to the filtering cartridge and then to the container.

Preferably, the oxidative degradation is carried out at a temperature from 30 to 39° C., more preferably at 36° C. In a particularly preferred embodiment of the invention, a daily degradation of at least 250 g of hydrocarbons transformed in $CO_2$ and $H_2O$, more preferably 500 g of hydrocarbons transformed in $CO_2$ and $H_2O$ is achieved.

The present invention will be better understood from the following examples, which are shown only with illustrative purposes to allow full understanding of the preferred embodiments of the present invention, without implying that there are no other embodiments that can be implemented based on the above detailed description.

EXAMPLES

Example 1

Obtainment of the Hydrocarbon-Oxidase Enzymatic Complex

An aerobic fermentation in aqueous medium was carried out, using a latent-stage microorganism inoculate of *Bacillus subtilis* (ATCC No. 31096), *Bacillus licheniformes* (ATCC No. 9945) and *Pseudomonas* spp. (ATCC No. 55648).

The culture medium consisted of a complex mixture of simple carbohydrates (sucrose, glucose, fructose) with amino acids, vitamins and heavy hydrocarbons, adjusted to a pH between 6.0 and 6.5. The presence of these hydrocarbons in the fermentation process was intended to induce the generation of the "hydrocarbon-oxidase" enzymatic complex. Also, a control measurement of the above-mentioned hydrocarbons was made using the soxhlet method, whereby it was possible to infer the production of this "hydrocarbon-oxidase" complex.

The fermentation process was carried out at a temperature of 36° C. for 48 hours, with a dissolved oxygen concentration of 3 ppm. At the end of the process, the pH was reduced to 5.5 and a counting of $4\times10^7$ UFC was obtained.

Example 2

Impregnation of the Filtering Cartridge with the Hydrocarbon-Oxidase Enzymatic Complex After making the fermentation process of Example 1, the supernatant liquid was filtrated and used to coat the filtering cartridges used in the solvent-free enzymatic industrial sink (FEIS) of the present invention, also applying a 1% methylparaben solution to prevent fungi growth.

Coating of the cartridges was made such that the actives were concentrated in a ball of hemp with a flow permittivity of 100 μm, i.e., it was coated and air-dried, repeating the procedure until the supernatant was saturated and to achieve a complete coating in each cartridge.

Example 3

Comparison of the System for Washing Mechanical Parts with Other Systems

A test was carried out applying the system of the present invention (with the coated cartridges of Example 2) for the cleaning of mechanical parts in processes of the food and metal mechanics industry, and their performance was compared to the application of a mechanical part cleaning system based on the use of a pre-inoculated cleaner, then receiving the following results from the users:

TABLE 1

Performance of systems for washing mechanical parts in different applications.

| Industry | System of the present invention | Pre-inoculated System |
|---|---|---|
| Food | After one-year use of the apparatus, the cleaning fluid shows no decomposition. | After three months of using the cleaning fluid it is saturated and foul-smelling. |
| Metal Mechanics | After one-year-and-a-half use of the apparatus, the cleaning fluid is not decomposed. | After six-months use the cleaning fluid is saturated and foul-smelling. |

As shown in Table 1, by using the system of the present invention for the washing of mechanical parts used in the food and metal mechanics industries, a continuous use of the cleaning fluid for at least one year is achieved, without decomposition thereof. On the other hand, when using the commercially-available systems, it is necessary to replace the cleaning fluid at least every three months, since it becomes saturated and decomposed, having foul-smelling. This difference is due to the use of the hydrocarbon-oxidase enzymatic complex, which achieves a more effective degradation of hydrocarbons polluting the mechanical parts, which prevents the cleaning fluid from becoming saturated or presenting signs of decomposition compared to the others, thus allowing a continuous use thereof.

According to what has been described above, it may be seen that the system and method for washing mechanical parts of the present invention has been devised to avoid the use of solvents, becoming environmentally friendly, as well as to achieve maximum oxidative degradation of hydrocarbons present in the mechanical parts, allowing the use of the cleaning fluid for an indefinite period of time, and it will be apparent to any person skilled in the art that the embodiments of the system and method for washing mechanical parts as described-above and illustrated in the appended drawings, are only illustrative and not limiting of the present invention, since several consideration changes in its details are possible without departing from the scope of the invention.

Therefore, the present invention should not be considered as restricted except for what is demanded by the prior art and by the scope of the appended claims.

The invention claimed is:

1. A system for washing mechanical parts, characterized in that it comprises:

i) a cleaning fluid to wash mechanical parts;

ii) an enzymatic complex catalyzing the oxidative degradation of hydrocarbons coating the mechanical parts; and, iii) a washing sink, wherein the cleaning fluid is compatible with the enzymatic complex and comprises by wt %: a) from 0.1 to 5.5% sodium xylenesulfonate; b) from 0.5 to 4.0% butyl carbitol or butyl cellosolve; c) from 0.01 to 3.5% of a low energy biodegradable surfactant; d) from 1.0 to 5.0% of a polar or anionic surfactant; e) from 0.3 to 1.7% antifoaming agent f) from 0.005 to 0.45% sodium carbonate; g) from 0.05 to 1.0% sodium metasilicate, or sodium hydroxide combined with a 50 wt % corrosion inhibitor; h) from 0.05 to 0.25% freshener; and, i) from 78.6 to 97.5% demineralized water.

2. The system for washing mechanical parts according to claim 1, wherein the cleaning fluid comprises by wt %: a) from 3.0 to 4.0% sodium xylenesulfonate; b) from 1.5 to 2.5% butyl carbitol or butyl cellosolve; c) from 0.01 to 0.5% of a low energy biodegradable surfactant; d) from 1.0 to 2.0% of a polar or anionic surfactant; e) from 0.5 to 1.5% antifoaming agent; f) from 0.20 to 0.40% sodium carbonate; g) from 0.3 to 0.8% sodium metasilicate, or sodium hydroxide combined with a 50 wt % corrosion inhibitor; h) from 0.10 to 0.20% freshener; and, i) from 88.1 to 93.35% demineralized water.

3. The system for washing mechanical parts according to claim 2, wherein the low energy biodegradable surfactant is caprylyl pyrrolidone.

4. The system for washing mechanical parts according to claim 2, wherein the anionic or polar surfactant is selected from nonyl phenol ethoxylated at 10 moles (NF-10), alkoxylated alcohols and sodium dodecyl benzene sulfonate.

5. The system for washing mechanical parts according to claim 4, wherein the anionic or polar surfactant is nonyl phenol ethoxylated at 10 moles (NF-10).

6. The system for washing mechanical parts according to claim 2, wherein the antifoaming agent is selected from a methyloxirane polymer with oxirane, and a despumarol silicone emulsion or a Dow Corning silicone emulsion.

7. The system for washing mechanical parts according to claim 6, wherein the antifoaming agent is methyloxirane polymer with oxirane.

8. The system for washing mechanical parts according to claim 2, wherein the corrosion inhibitor is selected from triethanolamine phosphate (CAS # 10017-56-8), the product referred to as "Becrosan 2125" from Lubrizol or the "Wedolit" product from Wedolit.

9. The system for washing mechanical parts according to claim 8, wherein the corrosion inhibitor is triethanolamine phosphate (CAS # 10017-56-8).

10. The system for the washing of mechanical parts, according to claim 1, wherein the cleaning fluid comprises in wt %: a) from 0.1 to 4.0% of sodium xylenesulfonate; b) from 0.5 to 2.5% butyl carbitol; c) from 0.01 to 0.5% caprylyl pyrrolidone; d) from 1.0 to 2.0% of nonyl phenol ethoxylated at 10 moles; e) from 0.5 to 1.5% methyloxirane polymer with oxirane; f) from 0.005 to 0.40% sodium carbonate; g) from 0.05 to 0.8% sodium metasilicate; h) from 0.10 to 0.20% freshener; and i) from 88.1 to 97.5% demineralized water.

11. The system for washing mechanical parts according to claim 1, wherein the enzymatic complex is a hydrocarbon-oxidase complex.

12. The system for washing mechanical parts according to claim 11, wherein the enzymatic complex is obtained from *Bacillus subtilis, Bacillus licheniformes* and *Pseudomonas* spp.

13. The system for washing mechanical parts according to claim 1, wherein the washing sink comprises:

i) a container or sink where the dirty mechanical parts to be washed are received, and including a drain defined therein;

ii) a reservoir tank wherein the cleaning fluid is placed, and which is placed on the bottom side of said container and in communication therewith through the drain;

iii) a detachable bulkhead located between the container and the reservoir tank, where the heating and instrumentation means required for the system operation are mounted, as well as a submerged pump recycling the cleaning fluid from the reservoir tank to the container or sink, first passing through a filtering device;

iv) a filtering device interconnected to the submerged pump, and a flexible hose supplying the cleaning fluid to wash the parts and to remove the hydrocarbons present therein, located at one side of the tank reservoir and below the container or sink;

v) a control panel to control the system operation; and, iv) a frame to support the container, the reservoir tank and the filtering device.

14. The system for washing mechanical parts according to claim 13, wherein the flexible hose includes a cleaning fixture in its outlet end, such as an inner flow brush, which facilitates circulation of the cleaning fluid to carry out the washing of mechanical parts.

15. The system for washing mechanical parts according to claim 13, wherein the heating means used is an electrical resistance; and, the instruments required for the operation are a temperature sensor of the thermocouple or resistive (RTD) type, first and second level detectors.

16. The system for washing mechanical parts according to claim 15, wherein the first and second level detectors are of the floating type with magnetic switch.

17. The system for washing mechanical parts according to claim 13, wherein the control panel consists of an electronic panel having a logical circuit controlling the sink functions; a plurality of indicating lights; and, an aeration pump which supplies air into the cleaning fluid through an air diffuser immersed in the fluid.

18. The system for washing mechanical parts according to claim 13, wherein the filtering device comprises a container having a filtering element inside coated with the enzymatic complex.

19. The system for washing mechanical parts according to claim 13, wherein the filtering cartridge is made of a filtering material consisting of a ball made from pleated paper or hemp.

20. The system for washing mechanical parts according to claim 19, wherein the filtering cartridge has a flow permittivity from 100 to 200 μm.

21. The system for washing mechanical parts according to claim 20, wherein the filtering cartridge is coated with a solution of up to 1% methylparaben.

22. The system for washing mechanical parts according to claim 21, wherein the filtering cartridge is coated with the enzymatic complex until saturation in each cartridge is achieved.

23. The system for washing mechanical parts according to claim 20, wherein the filtering cartridge has a flow permittivity of 100 μm.

24. A method for washing mechanical parts polluted with hydrocarbons, comprising the following steps:

i) placing mechanical parts to be washed in a container or sink;

ii) circulating a cleaning fluid from a reservoir tank to a filtering cartridge such that said cleaning fluid drags an enzymatic complex contained in said filtering cartridge;

iii) circulating the cleaning fluid having the enzymatic complex to the container or sink, and washing the mechanical parts with said cleaning fluid;

iv) draining the cleaning fluid from the container to the reservoir tank, wherein the enzymatic complex acts to carry out a hydrocarbon oxidative degradation; and, v) recycling the cleaning fluid to the filtering cartridge and then to the container, wherein the cleaning fluid is compatible with the enzymatic complex and comprises by wt %: a) from 0.1 to 5.5% sodium xylenesulfonate; b) from 0.5 to 4.0% butyl carbitol or butyl cellosolve; c) from 0.01 to 3.5% of a low energy biodegradable surfactant; d) from 1.0 to 5.0% of a polar or anionic surfactant; e) from 0.3 to 1.7% antifoaming agent f) from 0.005 to 0.45% sodium carbonate; g) from 0.05 to 1.0% sodium metasilicate, or sodium hydroxide combined with a 50 wt % corrosion inhibitor; h) from 0.05 to 0.25% freshener; and, i) from 78.6 to 97.5% demineralized water.

25. The method for washing mechanical parts polluted with hydrocarbons according to claim 24, wherein oxidative degradation is carried out at a temperature from 30 to 39° C.

26. The method for washing mechanical parts polluted with hydrocarbons according to claim 25, wherein oxidative degradation is carried out at 36° C.

27. The method for washing mechanical parts polluted with hydrocarbons according to claim 24, wherein by washing the mechanical parts, a daily degradation of at least 250 g of hydrocarbons transformed in $CO_2$ and $H_2O$ is achieved.

28. The method for washing mechanical parts polluted with hydrocarbons according to claim 27, wherein by washing the parts a daily degradation of 500 g of hydrocarbons transformed in $CO_2$ and $H_2O$ is achieved.

* * * * *